(12) United States Patent
Walton et al.

(10) Patent No.: US 7,236,672 B2
(45) Date of Patent: Jun. 26, 2007

(54) OPTICAL SYSTEMS UTILIZING OPTICAL FIBERS TRANSMITTING HIGH POWER SIGNAL AND A METHOD OF OPERATING SUCH SYSTEMS

(75) Inventors: Donnell Thaddeus Walton, Painted Post, NY (US); Ji Wang, Painted Post, NY (US); Luis Alberto Zenteno, Painted Post, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 41 days.

(21) Appl. No.: 11/095,080

(22) Filed: Mar. 30, 2005

(65) Prior Publication Data

US 2006/0222307 A1   Oct. 5, 2006

(51) Int. Cl.
*G02B 6/00* (2006.01)
*G02B 6/02* (2006.01)
*G02B 6/032* (2006.01)

(52) U.S. Cl. .................. 385/122; 385/123; 385/125
(58) Field of Classification Search ......... 385/122–128
See application file for complete search history.

(56) References Cited

U.S. PATENT DOCUMENTS

| | | | |
|---|---|---|---|
| 5,892,615 A * | 4/1999 | Grubb et al. | 359/341.31 |
| 5,949,941 A | 9/1999 | DiGiovanni | 385/127 |
| 5,966,491 A | 10/1999 | DiGiovanni | 385/127 |
| 6,477,307 B1 | 11/2002 | Tankala et al. | 385/127 |
| 6,483,973 B1 * | 11/2002 | Mazzarese et al. | 385/123 |
| 6,563,995 B2 * | 5/2003 | Keaton et al. | 385/127 |
| 7,164,830 B2 * | 1/2007 | Hiroishi et al. | 385/123 |
| 2004/0233941 A1 * | 11/2004 | Fajardo et al. | 372/6 |
| 2004/0258377 A1 * | 12/2004 | Berkey et al. | 385/123 |

* cited by examiner

*Primary Examiner*—Brian Healy
*Assistant Examiner*—Derek L. Dupuis
(74) *Attorney, Agent, or Firm*—Svetlana Z. Short

(57) ABSTRACT

An optical system comprises an optical fiber with gain producing core with an index of refraction $n_1$, surrounded by at least one cladding with an index of refraction $n_2$, said cladding including at least one index reduced area with an index of refraction $n_2$, such that $n_1 > n_2 > n_2$, the core propagating a signal at a spatial fundamental mode at a signal wavelength $\lambda_1$ and at a power level sufficient to generate optical power at a wavelength $\lambda_2$, where $\lambda_2 > \lambda_1$, and the at least one index reduced area in combination with the core provide has at least one cut-off fundamental spatial mode wavelength $\lambda_C$, and $\lambda_1 < \lambda_C$ and $\lambda_2 > \lambda_C$.

20 Claims, 4 Drawing Sheets

OPTICAL SYSTEMS UTILIZING OPTICAL FIBERS TRANSMITTING HIGH POWER SIGNAL AND A METHOD OF OPERATING SUCH SYSTEMS

BACKGROUND OF THE INVENTION

1. Field of the Invention

The present invention relates generally to optical systems that utilize optical fiber for propagating high power optical signal, and more particularly to lasers, laser amplifiers and oscillators with a rare earth doped optical fiber operating in high power regime.

2. Technical Background

Optical fiber has become a favorite medium for telecommunications due to its high capacity and immunity to electrical noise. Single clad rare earth doped optical fiber has been widely used in the field of optical amplifiers and fiber lasers. This type of fiber has relatively low capability of handling high power multimode optical sources due to the difficulty of efficiently coupling multimode light from a high power optical (light) source (also referred to herein as optical pump or pump) into the rare-earth doped fiber core.

To solve this problem and to increase the output power of fiber lasers, those of skill in the art utilize optical fiber with a double clad structure (referred herein as double clad optical fiber). Double clad rare-earth doped optical fiber is a fiber that has a core, an inner cladding layer surrounding the core and an outer cladding layer surrounding the inner cladding layer. Optical fibers with Yb doped cores and two cladding layers surrounding the core are disclosed, for example, in U.S. Pat. Nos. 6,477,307; 6,483,973; 5,966,491 and 5,949,941.

Double clad optical fiber has been used in applications requiring utilization of optical sources providing between 10 to 100 Watts of optical power, because double clad optical fiber is more efficient in retaining/utilizing optical power provided by the optical pump than single clad optical fiber. This higher efficiency is due to fiber's utilization of clad-to-core coupling of optical pump power. More specifically, rare-earth doped double clad optical fibers accept light from the optical pump into the inner cladding and then transfer light to the rare-earth doped core through the core to inner cladding interface, along the length of the optical fiber. Thus, the optical fiber converts a significant part of the multi-mode light propagated through the inner cladding into a single-mode output at a longer wavelength, by coupling the pump light into the rare-earth doped core.

The inner cladding of the double clad optical fiber has a higher index of refraction than the outer cladding, thus the pump energy is confined inside the inner cladding and is re-directed into the core. The optical fiber is optically active due to the presence of rare-earth dopant in the core, which can be excited to higher electronic energy levels when the optical fiber is pumped by a strong optical pump. The core is typically doped with at least one rare-earth element, for example, neodymium or ytterbium, to provide lasing capability in a single-mode output signal. Typically, a neodymium- or ytterbium-doped double-clad fiber is pumped with one or several high-power broad-area diode lasers (at 800 nm or 915 nm) to produce a single transverse mode output (at the neodymium four-level transition of 1060 nm or the ytterbium four level transition of 1030 nm-1120 nm, respectively). Thus, conventional double-clad arrangements facilitate pumping of the optical fiber using a multi-mode inner cladding for accepting and transferring pump energy to the fiber core along the length of the fiber. Cladding pumping can be utilized in fiber amplifiers, or employed to build high-power single mode fiber pump lasers.

In fiber laser applications rare-earths such as Nd, Yb or Er have three-level transitions that require at least 50% of total ions to be in the upper level (i.e., at least 50% inversion) to exhibit gain. These three level transitions result in production of gain (or lasing) in these wavelength ranges: 880-920 nm in Nd doped optical fibers, the 965-1020 nm in Yb doped optical fibers, 1510-1540 nm in Er doped optical fibers. All of these are earth ions have competing 4-level transitions that require much lower level of inversion to exhibit gain, as low as 3% to 4%. The wavelengths corresponding to the 4-level transitions are 1050-1100 nm transitions in Yb and Nd doped optical fibers, and the 1560-1600 nm transitions in Er doped optical fibers. For a given length of the optical fiber and a given double-clad geometry, four level transitions reach transparency (i.e. the condition when gain reaches the loss in the fiber) or laser threshold at a much lower pump power level than three-level transitions. Once the optical fiber exhibits gain or starts lasing as a 4-level system, it does not operate as a 3-level system, and provides the gain or lasing wavelength in an undesirable wavelength range.

The problem of unwanted 4-level lasing or gain is typically solved by adding filters such as dielectric filters to suppress gain in four-level transitions, or alternatively, by choosing a double-clad inner cladding area that "promotes" a higher pump power density to increase the local inversion. However, dichroic filters are difficult to make spectrally sharp enough so that no additional loss is added at three-level wavelengths. That is, such filters introduce power loss at the 3-level wavelengths. Furthermore, these dichroic filters add further complexity and expense to the overall system. Provision of higher pump density is typically achieved by utilizing optical fiber with the relatively small clad to core ratios. While this approach increases pump power density to promote three-level inversion it makes it difficult and/or inefficient to couple pump power into the optical fiber and add complexity to the pump power coupling system.

Furthermore, when the optical fiber generates and propagates a high power optical signal and when the optical power exceeds Raman threshold level, the signal light is shifted to longer wavelength via Simulated Raman scattering, inducing power loss at the operating wavelength and preventing further power buildup.

The problem of Simulated Raman scattering is typically solved by increasing the fiber core diameter and lowering its numerical aperture. However, optical fibers with low numerical apertures and large core diameters are very susceptible to the bend-induced losses. In addition, because of non standard dimensions, these fibers are difficult to handle because they are not compatible with existing fibers or fiber handling technologies (fiber cleavers and fusion splices). Finally, when such fiber is fusion spliced to an optical fiber with a smaller core diameter, the signal power does not couple effectively into a smaller core of the second optical fiber, and a large amount of signal power is lost at the splice due to mismatch between the core sizes.

Single polarization optical fibers are useful for ultra-high speed transmission systems or for use as a coupler fiber for use with, and connection to, optical components (lasers, EDFAs, optical instruments, interferometric sensors, gyroscopes, etc.). The polarization characteristic (single polarization) propagates one, and only one, of two orthogonally polarized polarizations within a single polarization band while suppressing the other polarization by dramatically increasing its transmission loss.

SUMMARY OF THE INVENTION

Definitions:

The following definitions and terminology are commonly used in the art.

Refractive index profile—the refractive index profile is the relationship between the relative refractive index (Δ%) and the optical fiber radius (as measured from the centerline of the optical fiber).

Birefringence—birefringence is the difference between the effective refractive indices of the two polarization modes.

Radii—the radii of the segments of the fiber are generally defined in terms of points where the index of refraction of the material used takes on a different composition. For example, the central core has an inner radius of zero because the first point of the segment is on the centerline. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, an down-doped annular segment surrounding the central core would have an outer radii located at the interface between the annular segment and the cladding.

Relative refractive index percent Δ%—the term Δ% represents a relative measure of refractive index defined by the equation:

$$\Delta\% = 100 \times (n_i^2 - n_c^2)/2n_i^2$$

where $n_i$ is the maximum refractive index of the index profile segment denoted as i, and $n_c$, the reference refractive index, is taken to be the refractive index of the cladding layer. Every point in the segment has an associated relative index measured relative to the cladding.

In accordance with one aspect of the present invention, an optical system 5 comprises an optical fiber with gain producing core with an index of refraction $n_1$, surrounded by at least one cladding with an index of refraction $n_2$, the cladding including at least one index reduced area with an index of refraction $n_2'$, such that $n_1 > n_2 > n_2'$. The core propagates signal at a spatial fundamental mode at a signal wavelength $\lambda_1$ and at a power level sufficient to generate optical power at a wavelength $\lambda_2$, where $\lambda_2 > \lambda_1$. The optical fiber has at least one cut-off fundamental spatial mode wavelength $\lambda_C$, wherein $\lambda_1 < \lambda_C$ and $\lambda_2 > \lambda_C$.

In accordance with some of the embodiments of the present invention, a rare earth doped optical fiber is provided which exhibits single polarization properties within a Single Polarization Band (SPB). The fibers parameters are selected such that the SPB coincides with an operating wavelength $\lambda_1$ and the wavelength $\lambda_2$ is outside the SPB.

However, in some of the embodiments SPB is zero and the rare-earth doped fiber is not a single polarization fiber (SPF). In these embodiments, as long as the undesirable wavelength $\lambda_2$ is filtered by the optical fiber because fiber cut-off wavelengths $\lambda_C$ is such that $\lambda_2 > \lambda_C$, the optical system is allowed to provide gain or lase at the desired wavelength $\lambda_1$.

One advantage of the optical system of the present invention is its capability to produce large amount gain or handling large amounts of optical power, thus being capable for use in a high power laser or an optical amplifier, while eliminating power loss due to SRS or "a four level "signal. Another advantage of the optical fiber of the present invention is that because it eliminates the need to use larger core diameter fiber in high power applications, making splicing to other optical fibers easier and more efficient.

In some embodiments of the optical system of the present invention the optical fiber is a single polarization fiber that is employed to propagate the signal wavelength of interest within the SPB and to eliminate propagation of optical power in wavelengths associated with either SRS or, in a three level system, to eliminate signals associated with the four level gain.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numerals will be used throughout the drawings to refer to the same or like parts.

Figure 1A:
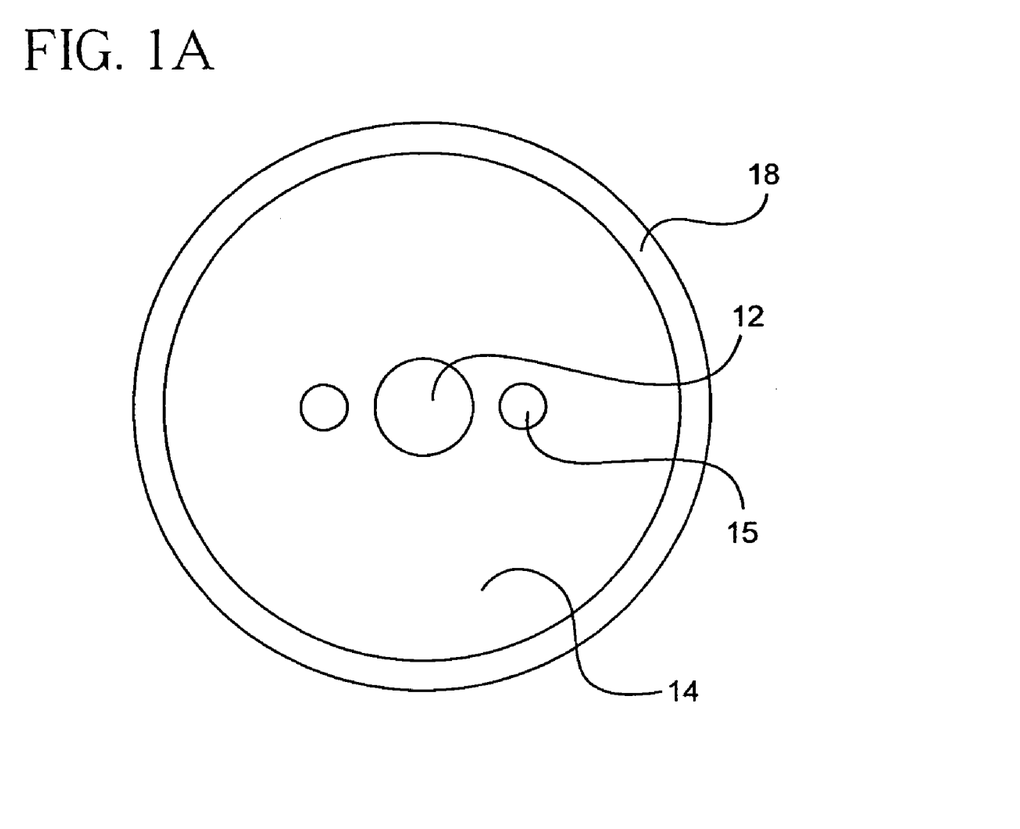
FIG. 1A is a schematic cross-sectional view of one embodiment of the present invention.
Figure 1B:
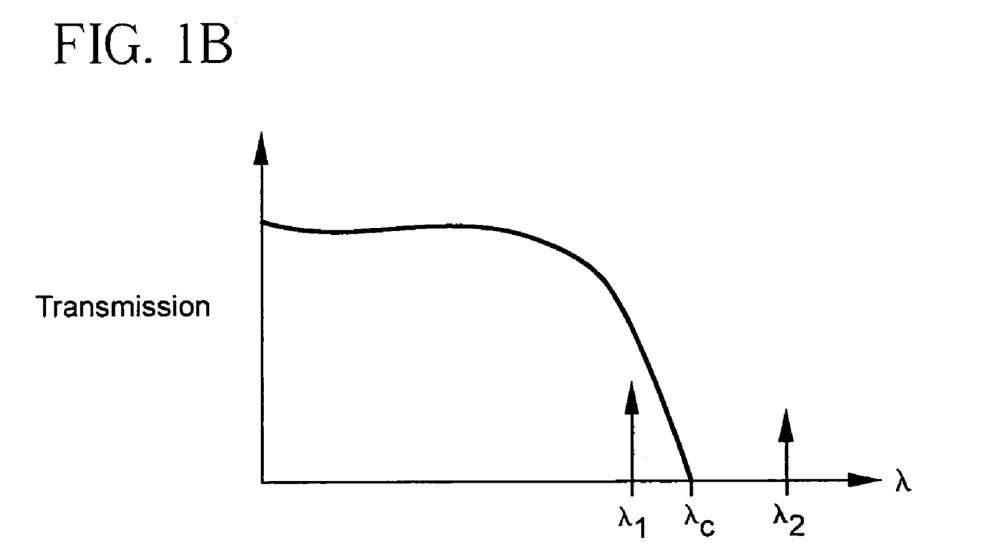
FIG. 1B is a schematic illustration of how the optical fiber of FIG. 1A filters out optical power generated at wavelength $\lambda_2$.

In accordance with one aspect of the present invention, an optical fiber 10 has a gain producing core 12 with an index of refraction $n_1$, surrounded by at least one cladding 14 with an index of refraction $n_2$. The cladding 14 includes at least one index reduced area 15 with an index of refraction $n_2'$, such that $n_1 > n_2 > n_2'$. The cross section of such exemplary fiber is illustrated, for example, in FIG. 1A. The core 12 produces gain and propagates signal at a spatial fundamental mode at a signal wavelength $\lambda_1$ at a power level sufficient to generate optical power at a wavelength $\lambda_2$, where $\lambda_2 > \lambda_1$. The optical fiber has at least one cut-off fundamental spatial mode wavelength $\lambda_C$, such that $\lambda_1 < \lambda_C$ and $\lambda_2 > \lambda_C$. This is illustrated in FIG. 1B. It is preferred that the index reducing area 15 be at least one and more preferably at least two air filled holes 24, 26 with an with an index of refraction $n_2' = 1$. Alternatively, the holes 24, 26 may contain down-doped sila-based rods that have lower refractive index than the rest of the cladding material. In some of the embodiments of the present invention the fiber core 12 is circular, while in other embodiments it is elongated. In some of the embodiments the core is, for example, elliptical. Other elongated core shapes may also be utilized.

For example, we will consider a double clad, ytterbium-doped fiber laser with a core diameter of 10 microns. We can estimate the requisite critical pump power $P_O^{cr}$ to reach the Raman threshold from equation (1):

$$P_O^{er} = \frac{16A_{eff}}{g_R L_{eff}}, \quad (1)$$

where $A_{eff}$ is the effective area of the transverse mode field, $L_{eff}$ is the effective length of the fiber, and $g_R$ is the Raman gain. If the fiber has the following parameters: $A_{eff}=78.5$ $m_2 L_{eff}=20$ m, $g_R=10^{-13}$ m/W, Raman power threshold is 628W. At this pump power level Raman scattering will generate optical power at the wavelength $\lambda_2$, which is Stoke-shifted due to Stimulated Raman Scattering (SRS) with respect to $\lambda_1$. In order to achieve output power beyond 628 W at the signal wavelength $\lambda_1$ with this fiber, the Raman scattering must be frustrated. If the operating wavelength of the laser is $\lambda_1=1064$ nm, the Raman scattered light will occur at approximately 440 cm$^{-1}$, or 1116 nm. If the fiber is designed such that the fundamental cutoff wavelength $\lambda_C$ occurs between these two wavelengths, at 1100 nm, for example, the Raman wavelength $\lambda_2$ will be filtered out. Thus, loss due to stimulated Raman scattering is either eliminated or minimized.

Figure 1C:
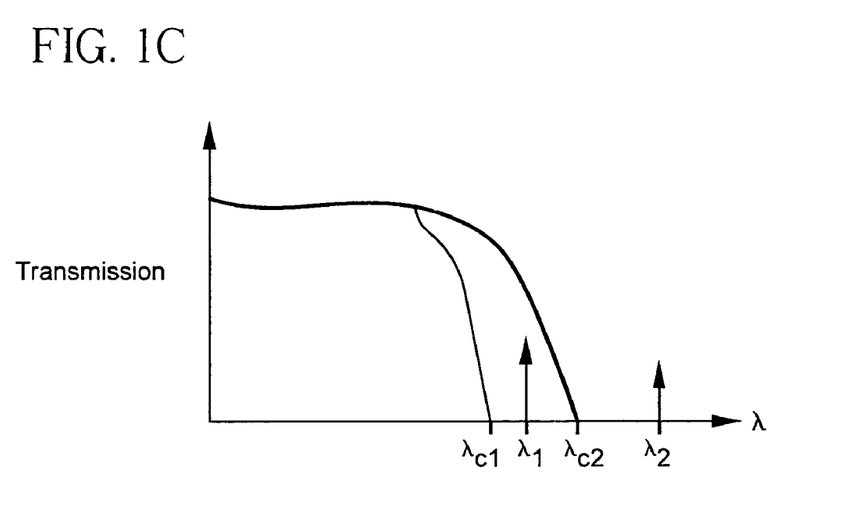
FIG. 1C is a schematic illustration of how a single polarization (SP) optical fiber filters out optical power generated at wavelength $\lambda_2$.

According to at least one embodiment of the present invention the wavelength $\lambda_2$ is Stoke—shifted due to Stimulated Raman Scattering (SRS) with respect to $\lambda_1$; and the optical fiber utilizes at least one hole (ether air filled, or filled with a silica-based material of relatively low index of refraction with respect to that of the rest of the cladding) to propagate the signal at this wavelength ($\lambda_1$) while filtering out the unwanted signal associated with the wavelength $\lambda_2$. Alternatively, the wavelength $\lambda_1$ corresponds to the signal that experiences "three level" gain and the wavelength $\lambda_2$ corresponds to the signal that experiences "four level" gain; and the optical fiber utilizes at least one hole (ether air filled, or filled with a silica-based material of relatively low index of refraction with respect to that of the rest of the cladding) to allow propagate the signal at wavelength $\lambda_1$ while filtering out signal at the wavelength $\lambda_2$. This is illustrated in FIG. 1C.

In some embodiments, the optical fiber 10 is a single polarization fiber and has two fundamental spatial mode cut off wavelengths (i.e., $\lambda_{C1}$ and $\lambda_{C2}$) defining Single Polarization Band (SPB). The optical fiber is employed to propagate the signal wavelength of interest within the SPB and to eliminate propagation of optical power in wavelengths associated with either SRS or, in a three level system, to eliminate signals associated with the four level gain. More specifically, the fiber's parameters are selected such that the SPB coincides with an operating wavelength $\lambda_1$ and the wavelength $\lambda_2$ is outside the SPB, because that $\lambda_2$ is larger than the second cut-off wavelength (i.e., $\lambda_2 > \lambda_C$, where $\lambda_C = \lambda_{C2}$).

In accordance to some other embodiments of the present invention, the SPB is equal to zero and the rare-earth doped optical fiber 10 is not a single polarization fiber. This is achieved, for example, by making holes 24, 26 small (less than 3 micron in diameter), or having relatively small core delta (less 0.2% and preferably less than 0.1%), or making the separation between core 12 and each hole greater than about 3 microns.

Such an optical fiber will have only one fundamental spatial mode cut-off wavelength $\lambda_C$, defined as the wavelength at which loss is 10 dB higher than the background propagation loss of the fiber. However, as long as $\lambda_1 < \lambda_C$ and $\lambda_2 > \lambda_C$, the longer undesirable wavelength(s) $\lambda_2$ is filtered out and the desirable wavelength $\lambda_1$ is allowed to propagate through the optical fiber. Thus, this type of the optical fiber may also be employed to propagate the signal wavelength $\lambda_1$ and to filter out propagation of optical power in wavelength $\lambda_2$ associated with either SRS or, in a three level system, to filter out optical signal at the wavelength $\lambda_2$ that associated with the four level gain.

Thus, one advantage of the optical system of the present invention is its capability to produce large amount gain or handling large amounts of optical power, therefore being capable for use in a high power laser or an optical amplifier, while eliminating power loss due to SRS or a "four level" signal. Another advantage of the optical system according to the present invention is that because it eliminates the need to use of larger core diameter fiber in high power applications, making splicing to other optical fibers easier and more efficient. Yet another advantage of the optical system according to the present invention is that it eliminates or minimizes the need to use of dichroic filters to eliminate 4-level signals.

According to one aspect of the present invention a method of operating an optical system comprises the steps of:
a. providing optical fiber with (i) gain producing core having an index of refraction $n_1$, (ii) at least one cladding surrounding the core and having an index of refraction $n_2$, the cladding including at least one index reduced area with an index of refraction $n_2'$, such that $n_1 > n_2 > n_2'$, the optical fiber having at least one cut-off fundamental spatial mode wavelength $\lambda_C$;
b. optically pumping the core and generating optical gain at a signal wavelength $\lambda_1$ in the core of the optical fiber, and propagating signal at a spatial fundamental mode at the signal wavelength through said core $\lambda_1$ at a power level sufficient to generate optical power at a wavelength $\lambda_2$, where $\lambda_2 > \lambda_1$, and $\lambda_2 < \lambda_C$;
c. preventing propagation of signal at the fundamental spatial mode at the wavelength $\lambda_2$, while propagating signal at the fundamental spatial mode at the wavelength $\lambda_1$, thereby minimizing power loss due to power shift from the signal of wavelength $\lambda_1$ to signal of wavelength $\lambda_2$.

Figure 1D:
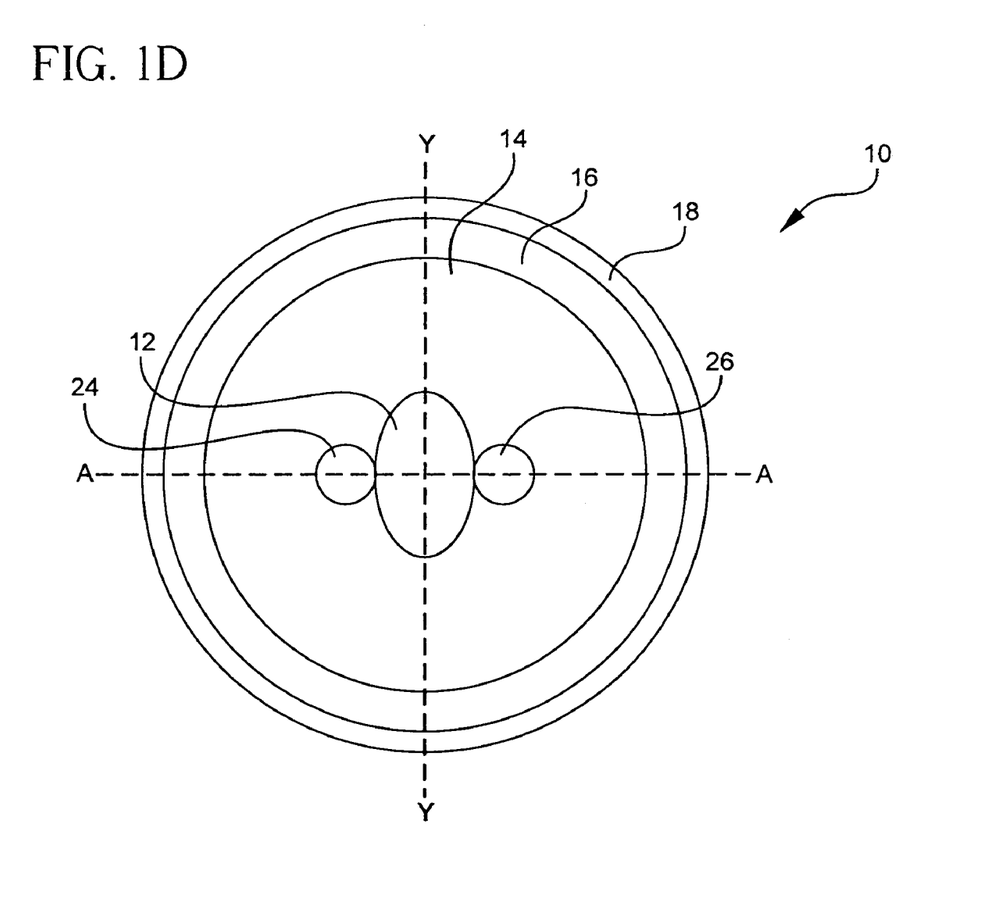
FIG. 1D is a schematic cross-sectional view of another embodiment of the present invention.

One embodiment of double clad single polarization optical fiber 10 of the optical fiber 10 in accordance with the present invention is shown schematically in FIG. 1D. This optical fiber 10 includes: silica based, rare earth doped core 12 having a first index of refraction $n_1$; and at least one cladding. In this example, the optical fiber 10 includes an elongated silica based core 12, a first silica based cladding 14 (inner cladding) surrounding the core 12 with a second index of refraction $n_2$, such that $n_1 > n_2$; and a silica based outer cladding 16 surrounding the first cladding 14 and having a third index of refraction $n_3$, such that $n_2 > n_3$. The inner cladding 14 contains at least two holes 24, 26, preferably situated in close proximity to the core 12 and on diametrically opposite sides of the core 12. The holes 24, 26 extend longitudinally through the length of the optical fiber 10. In this exemplary embodiment, the holes 24, 26 are air filled holes and (because of their low refractive index $n_2'=1$), lower the effective refractive index of the inner cladding 14

(along the line A-A, FIG. 1D) and enhance or enable single polarization property of this optical fiber. Alternatively, the holes 24, 26 may contain silica-base rods of glass with index of refraction $n_2'$, which is lower than that of the index of refraction $n_2$. The core 12, inner cladding 14 and the outer cladding 16 are preferably made of glass. A protective coating 18 surrounds the outer cladding 16. This optical fiber 10 supports a single polarization mode within the operating wavelength range, such that $\lambda_2$ is outside single polarization band of the optical fiber.

The outer protective coating 18 may be, for example, an organic coating which typically includes a softer primary coating and a harder secondary coating applied over the primary coating.

In this optical fiber shown in FIG. 1D the silica based core 12 is doped with Yb, but other rare earth materials, such as Er may also be utilized. The core 12 may also include at least one index raising dopant. The outer cladding further 16 preferably includes an index lowering dopant, such that $n_2 > n_3$ The inner cladding diameter $D_{IN}$ is preferably at least 125 μm and more preferably at least 200 μm. It is even more preferable that inner cladding diameter $D_{IN}$ is at least 225 μm and most preferable at least 250 μm. Applicants discovered that the thick inner cladding 14 and all-glass construction of the optical fiber work in synergy to allow the optical fiber to be coupled to high energy source, and to couple the high power into the core without damaging the optical fiber, while two air holes make this fiber a single polarization fiber. The size of the air holes may vary, preferably from 7 μm to 20 μm in diameter, depending on the desired size (minor axis) of the fiber core.

It is preferable that the outer cladding 16 be relatively thin, with wall thickness less than 80 μm and preferably between about 5 μm and 35 μm. It is most preferable that the wall thickness of the outer cladding 16 be between about 10 μm to 25 μm. It is preferable that the diameter $D_c$ of the fiber core 12 be about 5 μm to 20 μm, the inner cladding diameter $D_{IN}$ be about 125 μm to 2000 μm and more preferably about 125 μm to 1500 μm. It is even more preferable that $D_{IN}$ be about 125 μm to 350 μm. It is preferable that the diameter of the outer cladding diameter ($D_{OUT}$) be about 145 to 2100 μm, more preferably between about 145 μm to 1600 μm and even more preferable that $D_{OUT}$ be about 145 μm to 500 μm. If the inner cladding 14 does not have a circular cross section, $D_{IN}$ is defined as the smallest distance from one side of the inner cladding's cross section to the oppositely situated side of the cross section. It is also noted that the outer cladding 16 may not be circular. If the outer cladding 16 is not circular, $D_{OUT}$ is defined as the smallest distance from one side of the outer cladding's cross section to the oppositely situated side of the outer cladding's cross section. It is preferable that the inner cladding's 14 cross-sectional area be at least 200 times larger than the cross sectional area of the core 12. It is even more preferable that the cross sectional area of the inner cladding 14 be between 300 and 3000 times larger than the cross sectional area of the core 12. For example, the cross sectional area of the inner cladding 16 may be 500, 700, 1000, 1200, 1500, 1600, 2000 or 2500 times larger than the cross sectional area of the core 12.

According to this embodiment, the fiber core 12 includes, in weight percent:

| | |
|---|---|
| Rare earth | 0.1 to 2.5 wt %; |
| P | 0 to 5 wt %; |

-continued

| | |
|---|---|
| Al | 0.5 to 15 wt %; |
| Ge | 0.1 to 15 wt %; |
| F | 0 to 1 wt %. |

The rare earth dopants in the fiber core 12 provide active ions to enable either a gain or a lasing action. Exemplary rare earth dopants are Yb, Er, Nd, Tm, Sm and Tb. It is preferable that the amount of rare earth dopant in the core 12 be 0.5 wt % to 1.5 wt %. Phosphorus may be added to the core materials in order to lower the softening temperature of the core glass, which may be advantageous if the core is produced by the inside vapor deposition process. Phosphorus may also be utilized as a refractive index raising agent. However too much phosphorus (10% or more) provides nonlinearity through Stimulated Raman Scattering which may inhibit the lasing action. Aluminum may be added to the core as a de-clustering agent (for example, to de-cluster Yb, preferably at the ratio of Al to Yb of 5:1 to 10:1). The core 12 may also include Germanium which is an index raising dopant, and/or fluorine which is an index lowering dopant as well as a de-clustering agent.

The preferred ranges of the core 12 composition in weight percent are:

| | |
|---|---|
| Rare earth | 0.3 to 1 wt %; |
| P | 0 to 2 wt %; |
| Al | 2 to 8 wt %; |
| Ge | 3 to 15 wt %; and |
| F | 0.1 to 0.5 wt %. |

The Yb-doped core 12 will laze at 1.03-1.11 micron range.

It is preferable that the inner cladding 14 contain 5 wt % to 30 wt % Ge in order to provide high NA. It is even more preferable that the inner cladding comprise 5 wt % to 20 wt % Ge. It is noted that 5 wt % to 10 wt % Ge works well for many applications.

It is preferable that the index lowering dopant of the outer cladding 16 comprises Fluorine and/or Boron in weight percent:

| | |
|---|---|
| F | 0.5 to 5 wt %; |
| B | 0.5 to 20 wt %. |

The amount of dopant(s) for the outer cladding 16 is chosen to preferably result in inner cladding NA of between 0.15 to 0.5. However, it is preferable that the outer cladding 16 contain at least one of of B or/and F. It is preferable that the amount of B is at least 3 wt %. It is preferable to have more than 1 wt % and more preferably more than 2 wt % of F along with more than 8 wt % of B in the outer cladding 16. It is preferable that the outer cladding 16 has less than 5 wt % of F, and less than 15 wt % of B. It is even more preferable that the amount of B and F be: 2 to 4 wt % of F and 3 to 15 wt % of B.

Figure 2A:
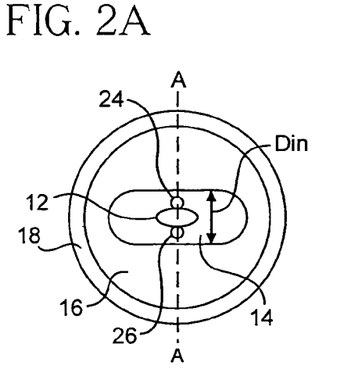
FIGS. 2A-2C are schematic cross-sectional views of other embodiments of the present invention.
Figure 2B:
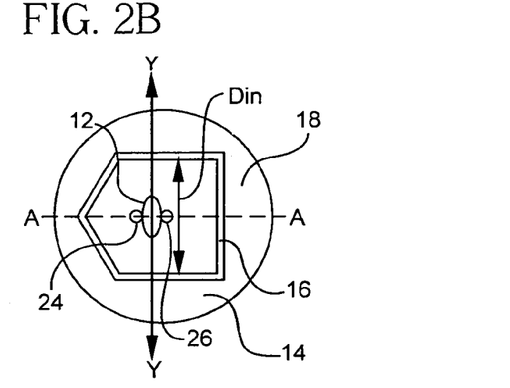
Figure 2C:
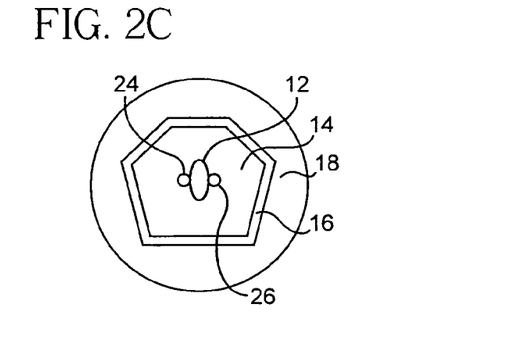

Other embodiments of the double clad optical fiber of the present invention are shown schematically in FIGS. 2A-2C and are generally described and depicted herein with reference to several exemplary or representative embodiments with the same numbers referenced to the same or functionally similar parts. The inner cladding 14 of the optical fiber of FIGS. 2A-2C is non-circular. The advantage of non-circular inner cladding 14 is that non-circular shape improves the absorption of optical pump power into the core 12. The elongated core 12 may be located either at the geometric center of the inner cladding, or may be displaced from the geometric center of the inner cladding.

The optical fiber core 12 is preferably elliptical, as shown in FIGS. 1D and 2A-2C, but may have either a circular, or other elongated shapes. Adjacent to the core and situated at least partially within the inner cladding 14 are at least two air holes 24, 26. The core 12, in conjunctions with the air holes 24, 26 renders this optical fiber a single polarization (SP) fiber. It is preferred that the aspect ratio (ratio of major to minor axis) of the elliptical core 12 be at least 1.5:1 and more preferably be between 2:1 and 10:1, because these aspect ratios improve birefringence of the core 12. However, as stated above, circular core geometry may also be utilized.

The core delta is less than 1% Δ and preferably less than 0.5% Δ. The numerical aperture NA of the core 12 is between 0.03 (for high power laser application) and 0.25 (for lower power application). The numerical aperture NA of the core 12 is defined as $(n_1^2-n_2^2)^{1/2}$, where $n_1$ is the index of refraction of the core 12 and $n_2$ is the index of refraction of the inner cladding 14.

The silica based inner cladding 14 may have a circular outer perimeter, as shown in FIG. 1D (preferably with an off-center situated core), or a non-circular outer perimeter as shown in FIG. 2A-C. The numerical aperture NA of the inner cladding 14 is defined as $(n_2^2-n_3^2)^{1/2}$, where $n_3$ is the index of refraction of the outer cladding layer 16. The inner cladding 14 preferably has numerical aperture NA between 0.15 and 0.45 and more preferably between 0.3 and 0.4.

In general, a double-clad structure that could be used in a fiber laser or in an amplifier includes two claddings. A first (inner) multi-mode cladding acts as a multi-mode pumping core. The inner cladding 14 is adjacent to the core 12 and a second (outer) cladding 16 surrounds the first or the inner cladding 14. The core 12 may be either single mode or multi-mode at the core lasing wavelength. The inner cladding 14 serves as a waveguide with a high numerical aperture NA for the input (pumping) light. That is, the inner cladding serves as a pump cavity. The larger the inner cladding diameter, the more pump light is coupled into the inner cladding from the optical source. The cross-section of the first multi-mode inner cladding ($D_{IN}$ is the shorter dimension of the inner cladding as seen in FIGS. 2A-2C) may be designed to have a desired shape, e.g., matched to the near field shape of the pump source or have any other which increases coupling efficiency of the (pump) light from the light source to the inner cladding. The numerical aperture of the inner cladding must be high enough to capture the output of the light source, such as the laser diode. Recent progress in semiconductor laser technology has led to the creation of light sources utilizing discrete or arrayed broad-area laser diodes coupled to the intermediate fiber incorporated within the light source. The output power of this light source is more than 150 Watt at 976 nm at the output end of the intermediate fiber. The diameter of the intermediate fiber and NA of light source is 200 μm and 0.22 NA, respectively.

The light from this light source is then coupled to a double clad optical fiber via high NA and large aperture lenses. With this approach one can obtain 85-90% of coupling efficiency.

EXAMPLES

The invention will be further clarified by the following examples.

Figure 3A:
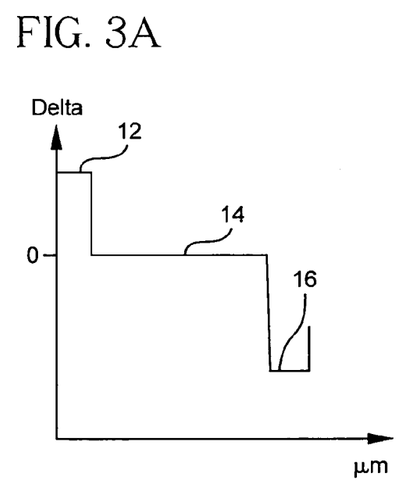
FIGS. 3A and 3B illustrate schematically relative a refractive index profile of an exemplary optical fiber of the present invention, across two different cross-sections of the fiber.
Figure 3B:
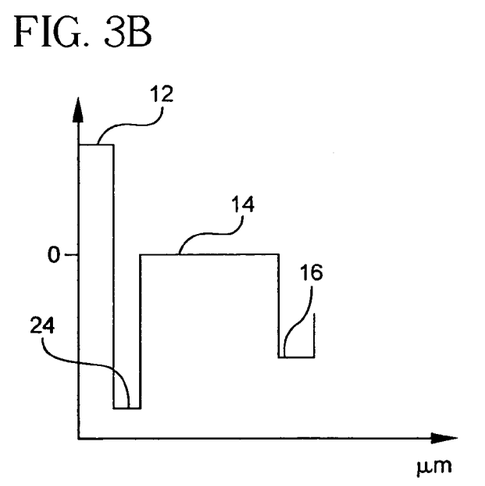

FIGS. 3A and 3B illustrate schematically a relative refractive index profile of the optical fiber of shown in FIG. 1D. More specifically, FIGS. 3A and 3B depicts optical fiber's refractive index percent delta (relative to that of the pure silica) vs. the distance measured from the core center. FIG. 3A illustrates schematically a refractive index profile taken across the region that does not contain the air holes, for example, along the line Y-Y of the fiber depicted in FIG. 1D. FIG. 3B illustrates schematically a refractive index profile of the same fiber, but taken across the region that contains the air hole 24 (for example, along the line A-A of the fiber depicted in FIG. 1D).

Figure 3C:
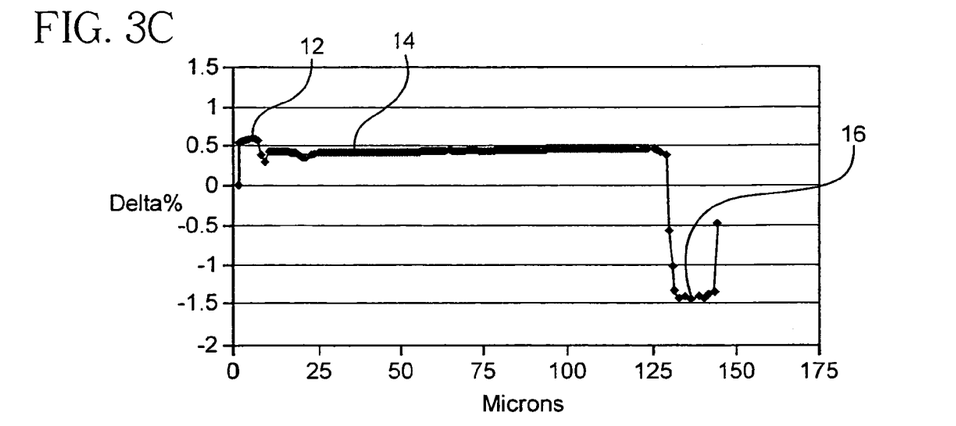
FIG. 3C is a measured refractive index profile of a first example of optical fiber in accordance with the present invention.

FIG. 3C illustrates measured refractive index profile (percent delta, relative to that of the pure silica) of another exemplary optical fiber of the present invention along the Y-Y axis, measured from the core center. This optical fiber has the cross-section illustrated in FIG. 2B. The distance $D_{IN}$ between two opposing flat sides of this inner cladding cross section is 260 μm. The refractive index percent delta is defined herein as $(n_i^2-n_s^2)/2n_i^2$, where i=1, 2 or 3 and ns is the refractive index of pure silica. This optical fiber has a Yb doped core 12, a Ge-silica inner cladding (% delta≈0.46) and an outer cladding 16 which doped with Fluorine and Boron.

FIG. 3C shows that the relative refractive index difference (percent delta) of the core 12 is about 0.56, that the fluorine/boron doped outer cladding 16 has the refractive index percent delta of about −1.4. The Yb-doped fiber core is single-mode for the wavelengths above 1 μm. If the core 12 is doped with Erbium, the optical fiber will be single-mode at lasing wavelength of 1.55 μm. The optical fiber 10 has a relatively low NA (about 0.065) for the core 12, and high NA (0.30) for the inner cladding 14. (The NA is defined by $(n_i^2-n_{i+1}^2)^{1/2}$.) This inner cladding NA is preferably higher than that of the pump-source, allowing high coupling efficiency for the pump light of 90% or better. The small core NA (0.065) enables single mode operation with a large core size (10.5 microns diameter). If the core NA is higher (0.13, for example), the core diameter would have to be smaller (about 5 microns, for example) in order to be single mode. The bigger core diameter and lower core NA allows the core 12 to stay single-mode, while allowing the core to take more pump-power from the inner cladding, and also increases fiber power handling capability. The specific composition for this exemplary optical fiber is:

Core 12: 0.6 wt % $Yb_2O_3$; 4.5 wt % $AL_2O_3$; 3.0 wt % $GeO_2$; 0.2 wt % F;
Inner cladding 14: 8.5 wt % $GeO_2$;
Outer cladding 16: 9 wt % B and 2.7 wt % F.

The amount of each dopant is optimized to ensure the high laser efficiency. The preferred inner cladding shape is not circularly symmetric, thus maximizing the pump absorption.

Figure 4:
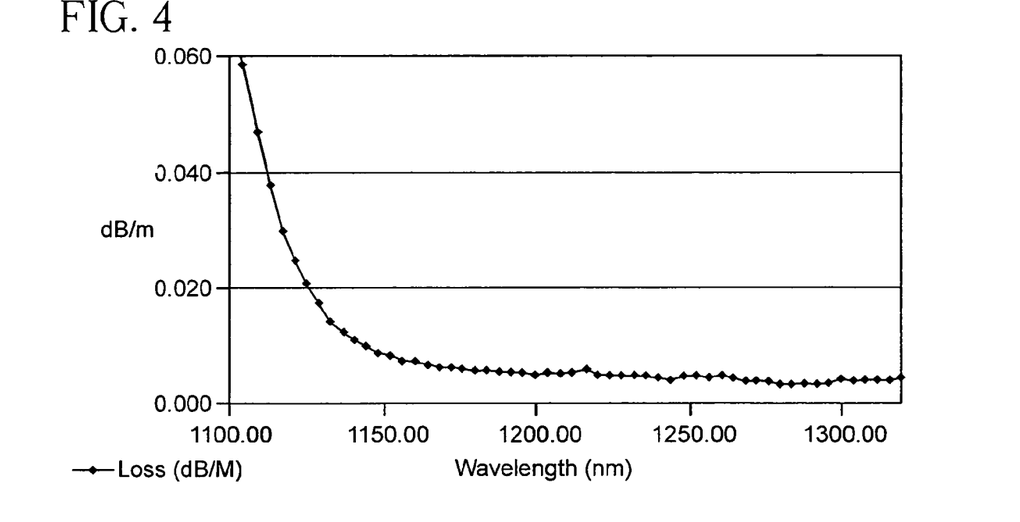
FIG. 4 is a graph illustrating passive core loss vs. wavelength of the optical fiber of FIG. 2B.

FIG. 4 illustrates the low passive loss, for example 3 dB/km at 1280 nm, achieved in the Yb-doped core of the fiber of FIG. 2B. The passive loss of the core (also referred to as a background loss) is the inherent loss from the core materials without the absorption-effect from the active dopants such as Yb or Er etc.

Figure 5:
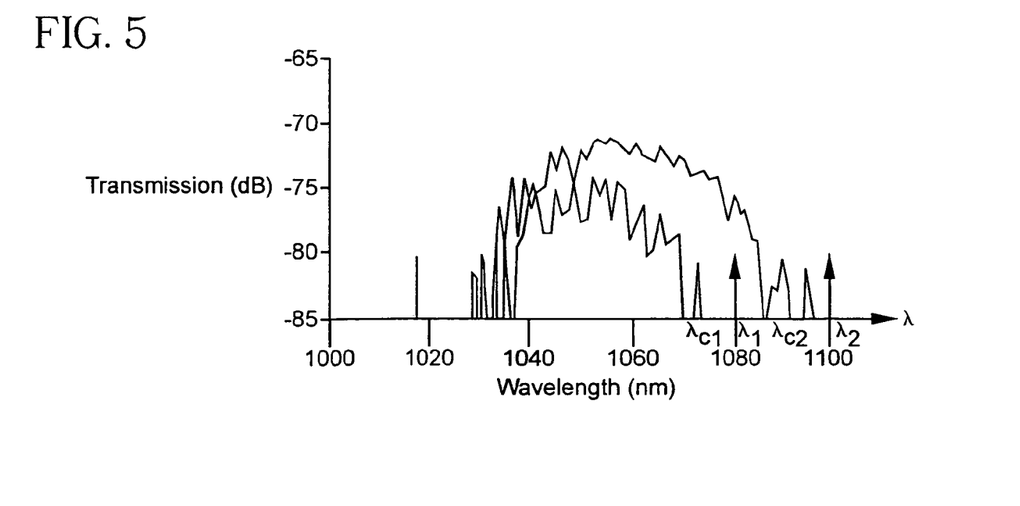
FIG. 5 is a graph illustrating single polarization property of the optical fiber of FIG. 2B.

FIG. 5 illustrates measured transmission spectrum of double clad single polarization fiber shown in FIG. 2B. The single polarization bandwidth is around 20 nm, centered at $\lambda_1$=1080 nm in which lasing taking place. In this exemplary fiber the first cutoff wavelength $\lambda_{C1}$ is about 1070 nm and the second cutoff wavelength $\lambda_{C2}$ is about 1090 nm. Thus optical power generated at wavelengths $\lambda_2$ larger than $\lambda_{C2}$ will be filtered out.

It will be apparent to those skilled in the art that variations and modifications can be made to the present invention without departing from the scope of the invention. For example, although step index structures are show, other graded index structures may be employed. Moreover a ring structure may be added to the fiber profile as well and would still function acceptably. Thus, it is intended that the present invention cover the modifications and variations of this invention provided they come within the scope of the appended claims and their equivalents.

What is claimed is:

1. An optical system comprising:
   (i) an optical fiber with gain producing core with an index of refraction $n_1$, surrounded by at least one cladding with an index of refraction $n_2$, said cladding including at least one index reduced area with an index of refraction $n_2$, such that $n_1 > n_2 > n_2$, said core propagating a signal at a spatial fundamental mode at a signal wavelength $\lambda_1$ and at a power level sufficient to generate optical power at a wavelength $\lambda_2$, where $\lambda_2 > \lambda_1$, and said at least one index reduced area in combination with said core provides at least one cut-off fundamental spatial mode wavelength $\lambda_C$, and $\lambda_1 < \lambda_C$ and $\lambda_2 > \lambda_C$, wherein (i) said at least one index reduced area does not surround said core, and (ii) said core and said at least one index reduced area are situated in close proximity to one another such that the distance between adjacent edges of said core and said at least one index reduced area is less than the core diameter.

2. The optical system according to claim 1 wherein $\lambda_2$ is Stoke-shifted due to Stimulated Raman Scattering (SRS) with respect to $\lambda_1$.

3. The optical system according to claim 2 wherein said index reduced area is at least one air-filled hole extending along the length of the optical fiber.

4. The optical system according to claim 2 wherein the optical fiber comprises:
   (i). a silica based, rare earth doped core having a first index of refraction $n_1$;
   (ii). a silica based inner cladding surrounding the core and having a second index of refraction $n_2$, such that $n_1 > n_2$, said inner cladding having a plurality of air holes extending longitudinally through the length of said optical fiber;
   (iii) a silica based outer cladding surrounding said inner cladding and having a third index of refraction $n_3$, such that $n_2 > n_3$;
   wherein said optical fiber supports a single polarization mode within the operating wavelength range such that SRS is suppressed and $\lambda_2$ is outside single polarization band of the optical fiber.

5. The optical fiber according to claim 2 wherein the core has a maximum dimension of 1.5 μm to 15 μm and a minimum dimension of 1 μm to 5 μm.

6. The optical system according to claim 1 wherein the optical power in fundamental spatial mode corresponding to both $\lambda_2$ and $\lambda_2$ is generated in said core, the wavelength $\lambda_1$ corresponds to the signal that experiences "three level" gain and the wavelength $\lambda_2$ corresponds to the signal that experiences "four level" gain, and said cladding includes at least one air hole situated in proximity to said core, so that $n_2=1$.

7. The optical system according to claim 6 wherein the optical fiber comprises:

(i). a silica based, rare earth doped core having a first index of refraction $n_1$;
   (ii). a silica based inner cladding surrounding the core and having a second index of refraction $n_2$, such that $n_1 > n_2$, said inner cladding having a plurality of air holes extending longitudinally through the length of said optical fiber;
   (iii) a silica based outer cladding surrounding said inner cladding and having a third index of refraction $n_3$, such that $n_2 > n_3$;
   wherein said optical fiber supports a single polarization mode within the operating wavelength range such that $\lambda_2$ is outside single polarization band of the optical fiber.

8. The optical system according to claim 1 wherein said index reduced area is at least one air-filled hole extending along the length of the optical fiber.

9. The optical fiber according to claim 8 wherein said air holes are circular with a diameter of 7 to 20 μm.

10. The optical fiber according to claim 8 wherein said inner cladding contains an even number of air holes.

11. The optical system according to claim 1 wherein said index reduced area is at least one glass rod situated inside said cladding and extending along the length of the optical fiber and said optical fiber does not include a moat between said core and said at least one cladding.

12. The optical system according to claim 1 wherein the optical fiber comprises:
   (i). a silica based, rare earth doped core having a first index of refraction $n_1$;
   (ii). a silica based inner cladding surrounding the core and having a second index of refraction $n_2$, such that $n_1 > n_2$, said inner cladding having a plurality of air holes extending longitudinally through the length of said optical fiber;
   (iii) a silica based outer cladding surrounding said inner cladding and having a third index of refraction $n_3$, such that $n_2 > n_3$;
   wherein said optical fiber supports a single polarization mode within the operating wavelength range such that $\lambda_2$ is outside single polarization band of the optical fiber.

13. The optical fiber according to claim 1 wherein said core is rare earth doped core that is either circular or elongated.

14. The optical fiber according to claim 1 wherein said core is elliptical and the ratio of its maximum dimension to its minimum dimension is at least 1:1.5.

15. The optical fiber according to claim 1 wherein the shortest dimension of said inner cladding is at least 145 μm.

16. The optical fiber according to claim 1 wherein the core delta is 0.5% Δ or less.

17. The optical fiber according to claim 1 wherein $\lambda_1$ is 1000 to 1120 nm.

18. A method of operating an optical system, said method comprising the steps of:
   (a) providing optical fiber with (i) gain producing core having an index of refraction $n_1$, (ii) at least one cladding surrounding the core and having an index of refraction $n_2$, the cladding including at least one index reduced area adjacent to said core, said at least one index reduced area having an index of refraction $n_2$, such that $n_1 > n_2 > n_2$, wherein (i) said at least one index reduced area does not surround said core, and (ii) said core and said at least one index reduced area are situated in close proximity to one another such that the distance between adjacent edges of said core and said at least one index reduced area is less than the core diameter, the optical fiber having at least one cut-off fundamental spatial mode wavelength $\lambda_C$;

(b) optically pumping the core and generating optical gain at a signal wavelength $\lambda_1$ in the core of the optical fiber, and propagating a signal at a spatial fundamental mode at the signal wavelength through said core $\lambda_1$ at a power level sufficient to generate optical power at a wavelength $\lambda_2$, where $\lambda_2 > \lambda_1$, and $\lambda_2 < \lambda_C$;

(c) preventing propagation of signal at the fundamental spatial mode at the wavelength $\lambda_2$, while propagating signal at the fundamental spatial mode at the wavelength $\lambda_1$, thereby minimizing power loss due to power shift from the signal of wavelength $\lambda_1$ to signal of wavelength $\lambda_2$.

19. The method of operating the optical system according to claim 18 wherein: (i) $\lambda_2$ is Stoke-shifted due to Stimulated Raman Scattering (SRS) with respect to $\lambda_1$; and (ii) said cladding includes at least one air hole situated in proximity to said core, so that $n_2 = 1$.

20. The method of operating the optical system according to claim 18 wherein (i) the optical power in fundamental spatial mode corresponding to both $\lambda_2$ and $\lambda_1$ is generated in said core, the wavelength $\lambda_1$ corresponds to the signal that experiences "three level" gain and the wavelength $\lambda_2$ corresponds to the signal that experiences "four level" gain; and (ii) said cladding includes at least one air hole situated in proximity to said core, so that $n_2 = 1$.

* * * * *

UNITED STATES PATENT AND TRADEMARK OFFICE
CERTIFICATE OF CORRECTION

PATENT NO. : 7,236,672 B2  Page 1 of 1
APPLICATION NO. : 11/095080
DATED : June 26, 2007
INVENTOR(S) : Donnell Walton et al.

It is certified that error appears in the above-identified patent and that said Letters Patent is hereby corrected as shown below:

| No. | Col. | Line | Description |
|---|---|---|---|
| 1 | 1 | 14 | Please add the following <u>new</u> paragraph on page 1 prior to the priority claim paragraph. |

This invention was made with Government support under Cooperative Agreement No. MDA972-02-3-0004 awarded by The Defense Advanced Research Projects Agency. The Government may have certain rights in some of the claims of this invention.

Signed and Sealed this

Twenty-seventh Day of January, 2009

JOHN DOLL
*Acting Director of the United States Patent and Trademark Office*